US008225552B2

(12) United States Patent
Yokomori et al.

(10) Patent No.: US 8,225,552 B2
(45) Date of Patent: Jul. 24, 2012

(54) DOOR-OPENING DEVICE FOR A VEHICLE SLIDING DOOR

(75) Inventors: Kazuhito Yokomori, Yokohama (JP); Tomoya Yamaguchi, Yokohama (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 782 days.

(21) Appl. No.: 12/265,412

(22) Filed: Nov. 5, 2008

(65) Prior Publication Data

US 2009/0133333 A1    May 28, 2009

(30) Foreign Application Priority Data

Nov. 8, 2007  (JP) ................................. 2007-290762

(51) Int. Cl.
*E05F 15/14* (2006.01)
*B60J 5/06* (2006.01)
(52) U.S. Cl. ............................ 49/360; 49/209; 296/155
(58) Field of Classification Search .................. 49/360, 49/208, 209, 212, 221; 296/155
See application file for complete search history.

(56) References Cited

U.S. PATENT DOCUMENTS

| 4,640,050 A * | 2/1987 | Yamagishi et al. ............. 49/280 |
| 5,042,831 A * | 8/1991 | Kuhns .......................... 280/656 |
| 5,832,669 A * | 11/1998 | Mizuki et al. ................. 49/360 |
| 5,833,301 A * | 11/1998 | Watanabe et al. .............. 296/155 |
| 5,934,022 A * | 8/1999 | Faubert .......................... 49/360 |
| 2004/0003542 A1 * | 1/2004 | Shimada et al. ................ 49/360 |
| 2004/0182008 A1 * | 9/2004 | Yokomori et al. ............. 49/360 |
| 2004/0216383 A1 * | 11/2004 | Rogers et al. .................. 49/360 |
| 2004/0221511 A1 * | 11/2004 | Rogers et al. .................. 49/360 |
| 2005/0055883 A1 * | 3/2005 | Sato et al. ...................... 49/360 |
| 2005/0150167 A1 * | 7/2005 | Yokomori ....................... 49/360 |
| 2006/0042168 A1 * | 3/2006 | Yamada et al. ................. 49/360 |
| 2006/0267374 A1 * | 11/2006 | Jackson et al. ............... 296/146.4 |

FOREIGN PATENT DOCUMENTS

| JP | 05-036058 Y2 | 9/1993 |
| JP | 10-205214 A | 8/1998 |

* cited by examiner

*Primary Examiner* — Katherine W Mitchell
*Assistant Examiner* — Justin Rephann
(74) *Attorney, Agent, or Firm* — Sughrue Mion, PLLC

(57) ABSTRACT

A sliding door slides along the side of a vehicle. An electric drive unit is disposed on a floor of the vehicle and a lower guide rail is disposed under the floor. A lower roller bracket coupled to the sliding door moves along the lower guide rail back and forth. A door-opening outer tube mounted to the sliding door extends from the electric drive unit to a rear wire guide at the rear end of the lower guide rail. A door-closing outer tube extends from the electric drive unit to a front wire guide at the front end of the lower guide rail. A door-opening wire extends through the door-opening outer tube from the electric drive unit to the lower roller bracket. A door-closing wire extends through the door-closing outer tube from the electric drive unit to the lower roller bracket.

3 Claims, 8 Drawing Sheets

DOOR-OPENING DEVICE FOR A VEHICLE SLIDING DOOR

BACKGROUND OF THE INVENTION

The present invention relates to a door-opening device for a vehicle sliding door.

JP5-36058Y2 and JP10-205214A disclose a door-opening device for a vehicle sliding door.

JP5-36058Y2 discloses that the lower guide rail and electric drive unit are disposed under the vehicle floor, the wire being mounted to the sliding door such that the wire can be wound onto or taken out of the rotary drum in the electric drive unit, the wire being mounted to the lower roller bracket moving in the lower guide rail to allow the sliding door to open and close by the electric drive unit.

JP10-205214A discloses that the lower guide rail is disposed under the vehicle floor, the electric drive unit being disposed on the floor, the wire being mounted to the sliding door such that the wire is wound onto and taken out of the rotary drum in the electric drive unit, the wire being coupled to the lower roller bracket moving in the lower guide rail and to the rear roller bracket moving in the rear guide rail on the side of the vehicle to allow the sliding door to open and close automatically by the electric drive unit.

In JP5-36058Y2, the electric drive unit is disposed under the vehicle floor, is subjected to poor conditions such as rainwater and dust and is disadvantageous to waterproofing.

In JP10-205214A, the electric drive unit is disposed on the floor in the vehicle and suitable to waterproofing, but the wire wound on the rotary drum of the electric drive unit are connected to the lower roller bracket and rear roller bracket apart from the lower roller bracket. The wire is too long and is disadvantageous.

SUMMARY OF THE INVENTION

In view of the disadvantages, it is an object of the invention to provide a door-opening device for a vehicle sliding door, comprising an electric drive unit that is suitable to waterproofing, a wire that extends from the electric drive unit having a minimum length.

BRIEF DESCRIPTION OF THE DRAWINGS

The features and advantages of the invention will become more apparent from the following description with respect to an embodiment as shown in accompanying drawings wherein.

DETAILED DESCRIPTION OF PREFERRED EMBODIMENTS

Figure 1:
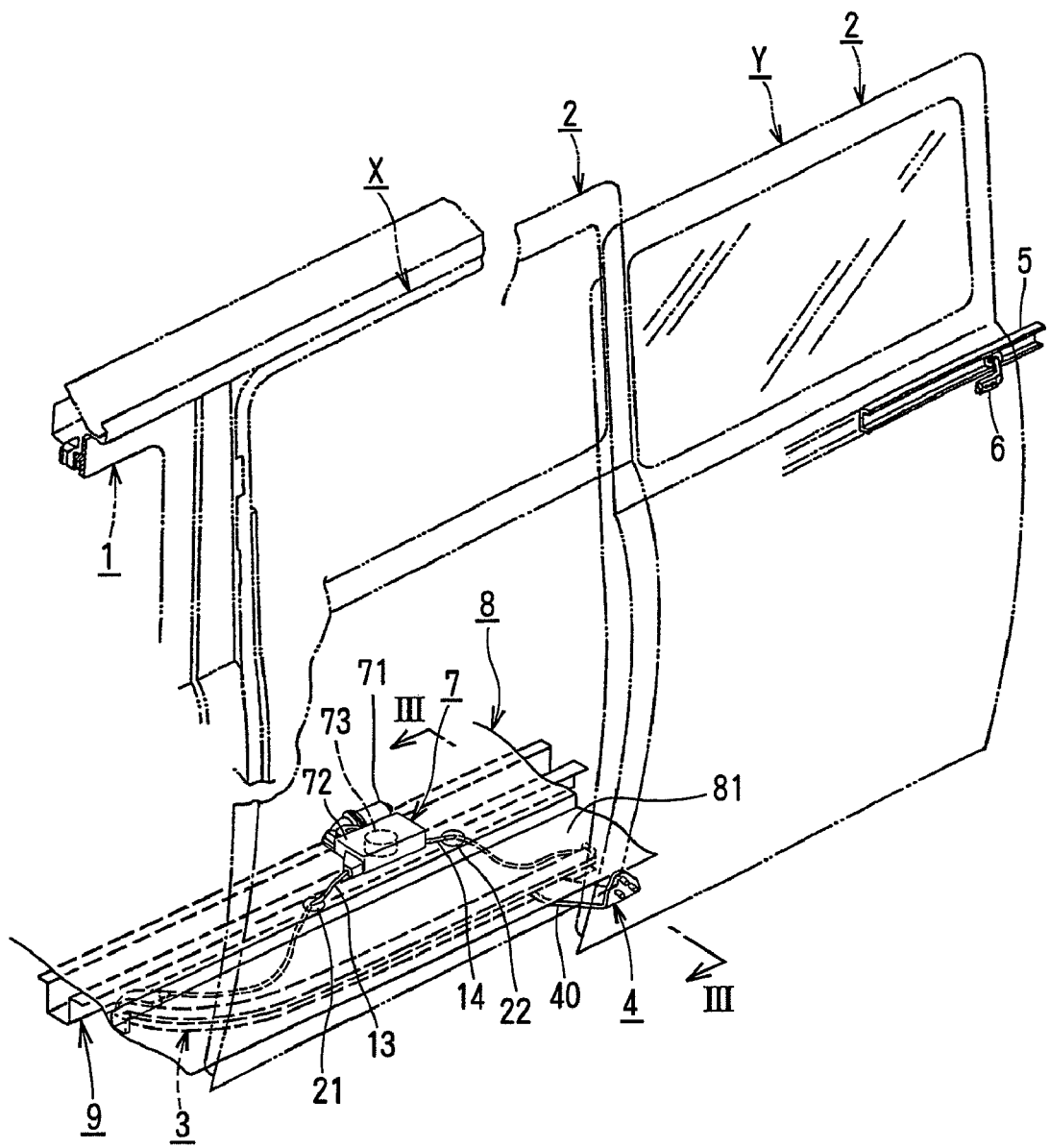
FIG. 1 is a perspective view of a vehicle including a door-opening device according to the present invention.

In FIG. 1, the numerals 1 and 2 denote a vehicle body and a sliding door respectively. On the underside of a step 81 integrally formed with a floor 8 of the vehicle body 1, there is disposed a lower guide rail 3 the front part of which curves inward of a vehicle body 1. On the underside of the floor 8, a U-sectioned side frame 9 for reinforcing the vehicle body is disposed inside the lower guide rail 3.

A lower roller bracket 4 mounted on the inner surface of a front lower part of the sliding door 2 slides in the lower guide rail 3 back and forth. On the side of the vehicle body 1, a waist guide rail 5 is fixed in which a waist roller bracket 6 on the sliding door 2 slides back and forth.

An electric drive unit 7 for opening and closing the sliding door 2 automatically is disposed on the floor 8 under a rear seat 10 in a passenger compartment. The floor 8 is advantageous to waterproofing. A space which is not usually used under a rear seat can be effectively utilized in this invention.

The lower roller bracket 4, the waist roller bracket 6 and an upper roller bracket (not shown) slide along the lower guide rail 3, the waist guide rail 5 and an upper guide rail (not shown) fixed on an upper part of the vehicle body 1 respectively to allow the sliding door 2 to project slightly from the side of the vehicle body 1 from a full-closed position X in dotted lines and to move back to a full-open position Y in dotted lines in FIG. 1 and vice versa.

Figure 3:
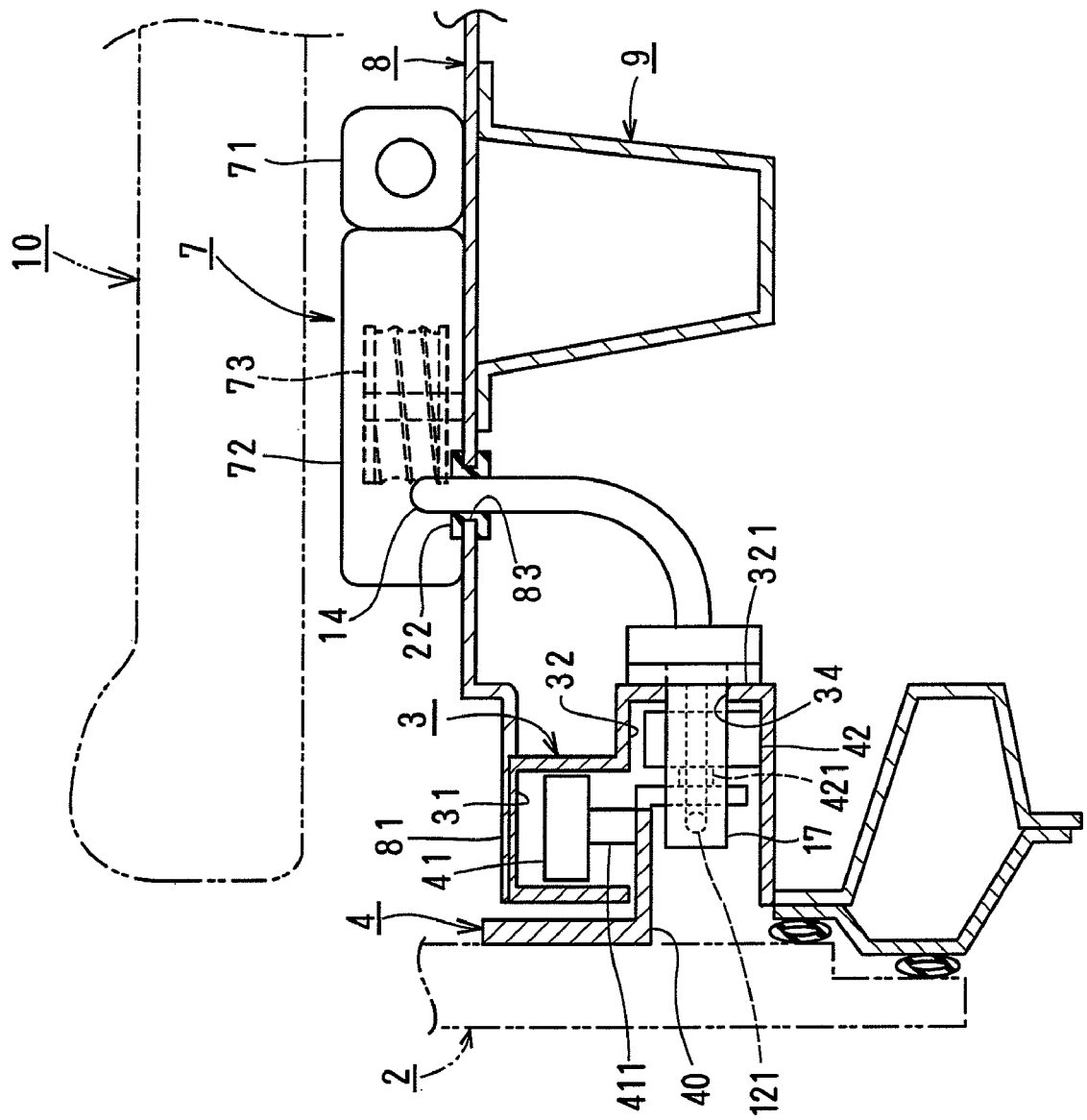
FIG. 3 is a vertical sectional view taken along the line III-III in FIG. 1.
Figure 4:
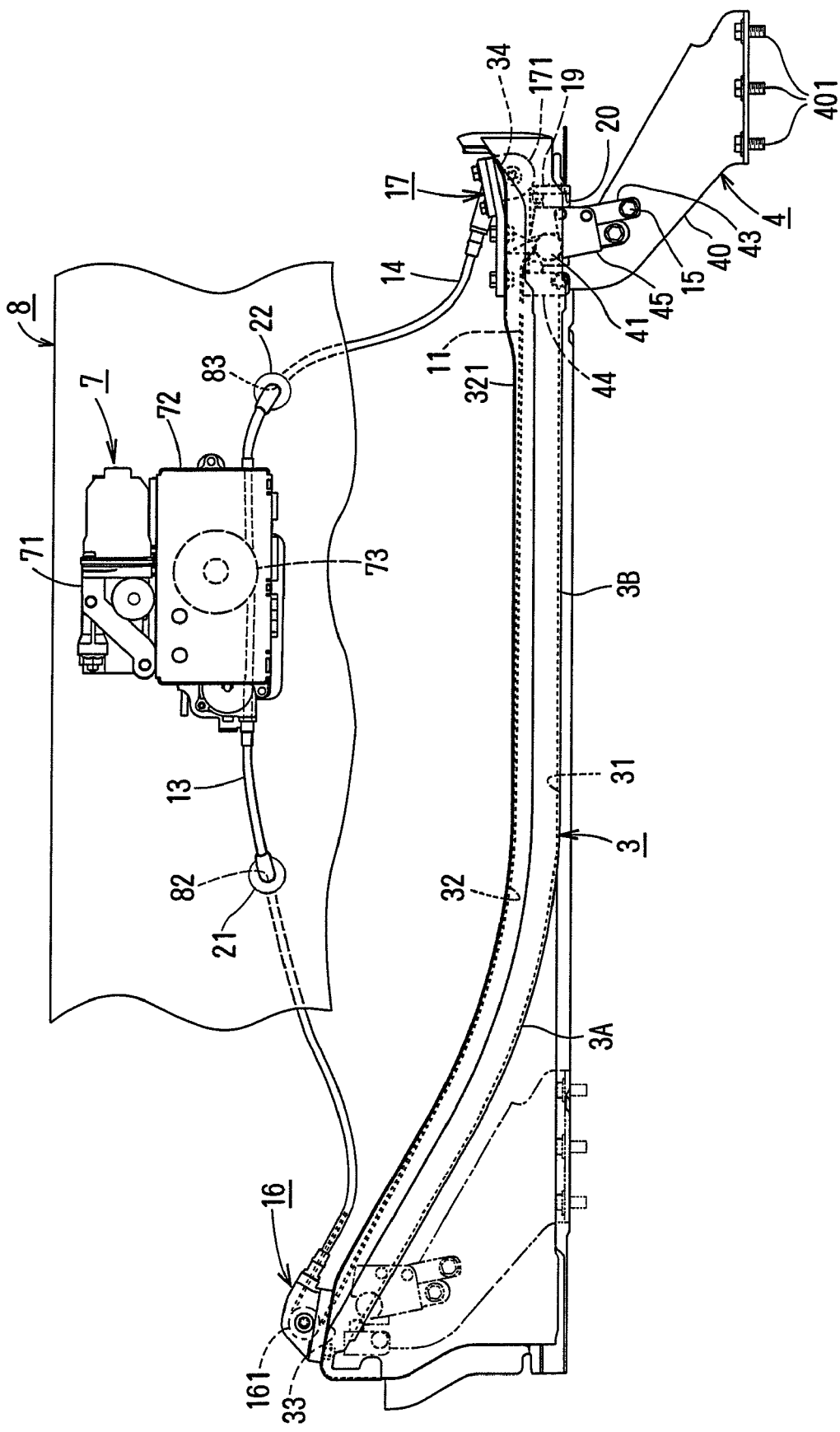
FIG. 4 is a plan view of the door-opening device according to the present invention.
Figure 9:
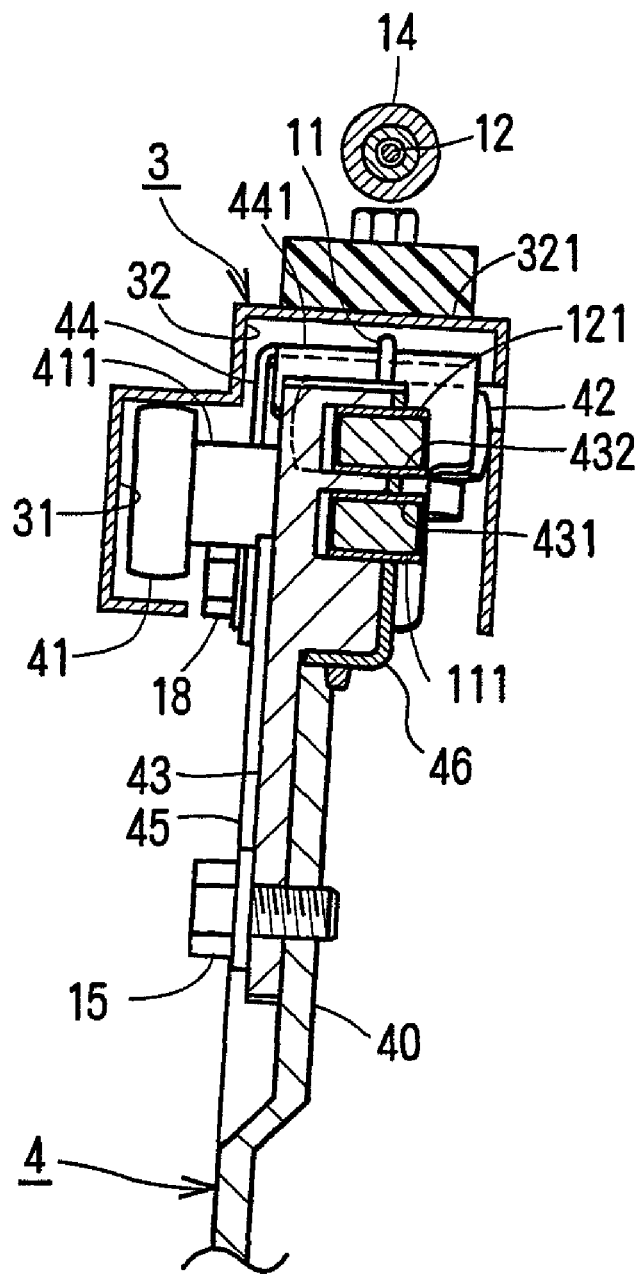
FIG. 9 is a sectional view taken along the line IX-IX in FIG. 8.

In FIGS. 3 and 9, the lower guide rail 3 is open outward of the vehicle body 1. In FIG. 4, the lower guide rail 3 comprises a curved portion 3A curving inward of the vehicle body 1 in the front half, and a straight portion 3B in the rear half, and includes a horizontal guide path 31 and a vertical guide path 32 lower than the horizontal guide path 31.

Figure 5:
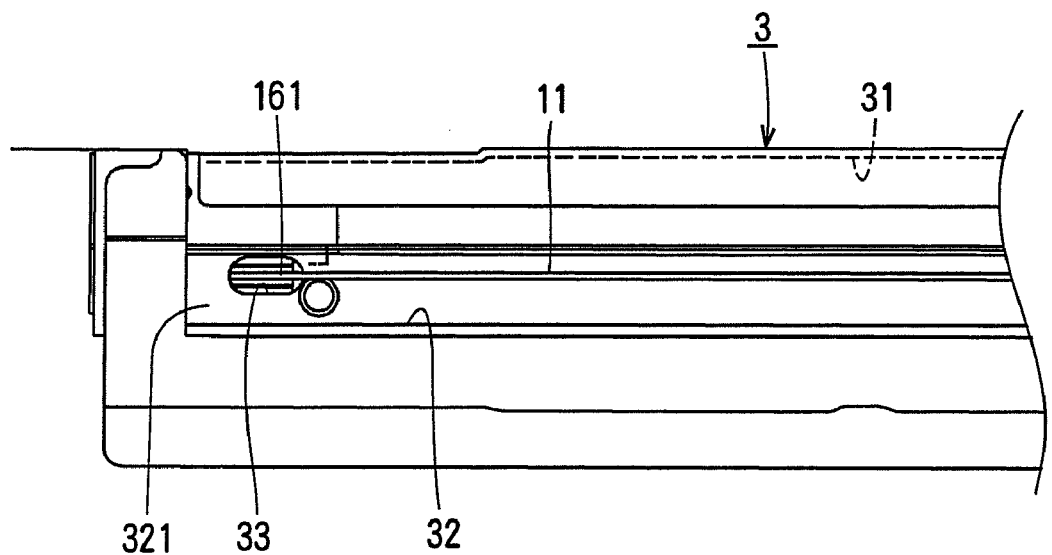
FIG. 5 is a side view of the front of a lower guide rail seen from the outside of the vehicle.
Figure 6:
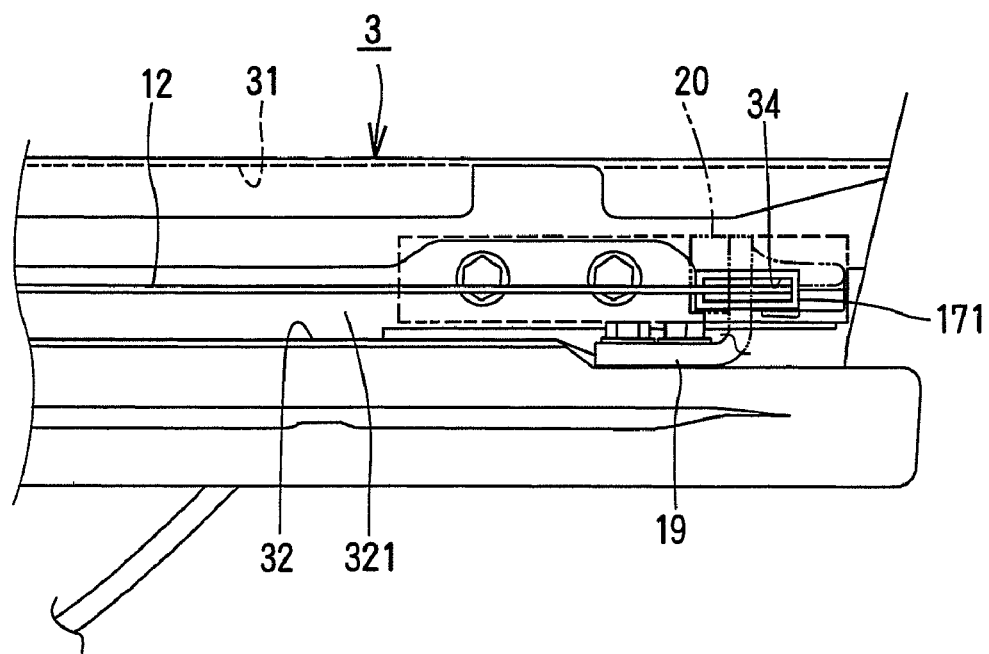
FIG. 6 is a side view of the rear of the lower guide rail seen from the outside of the vehicle.
Figure 7:
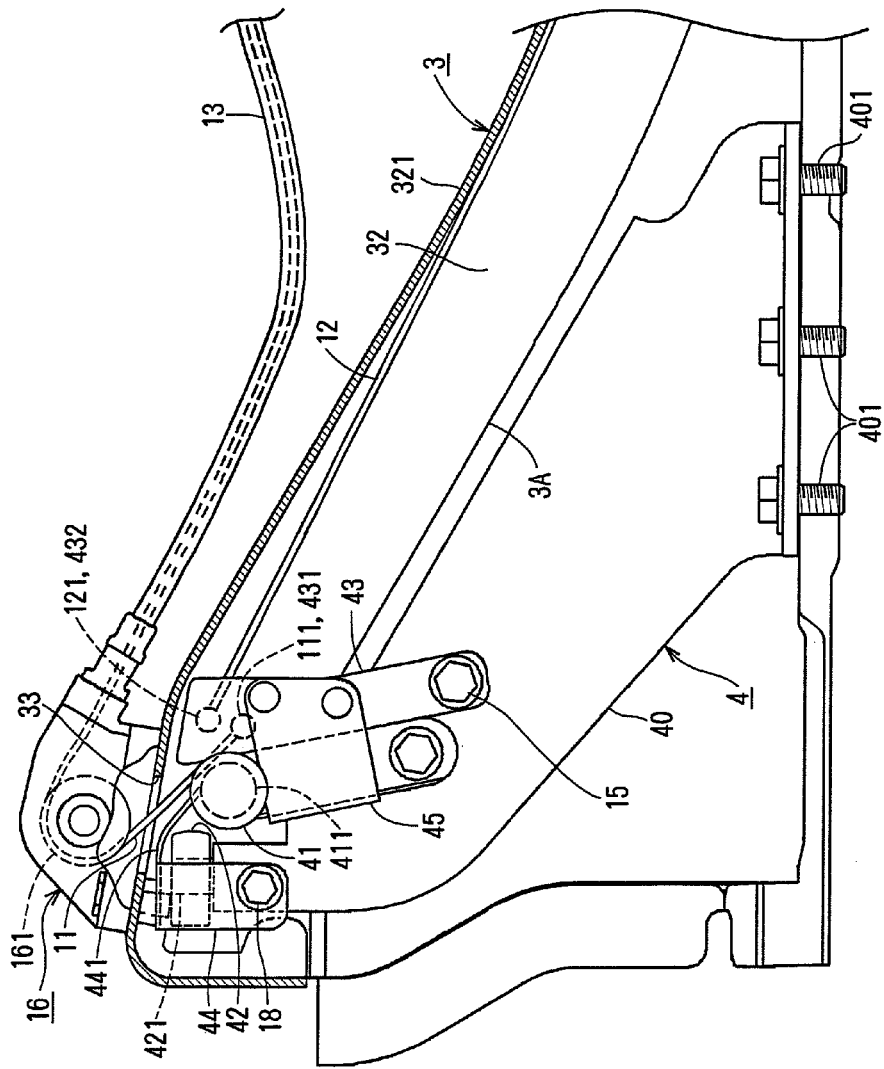
FIG. 7 is a horizontal sectional plan view of the front of the lower guide rail and a lower guide bracket.
Figure 8:
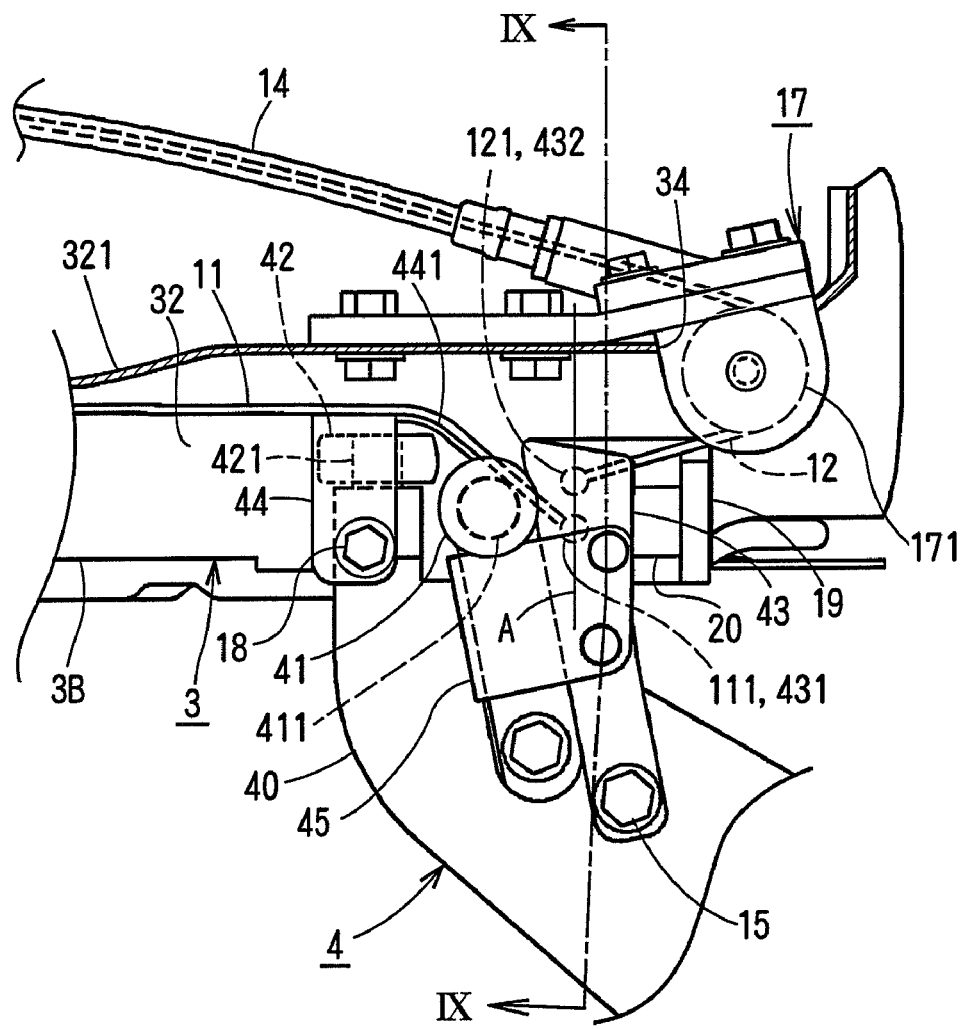
FIG. 8 is a horizontal sectional plan view of the rear of the lower guide rail and the lower guide bracket.

In FIGS. 5 and 7, at the front end of a side wall 321 of the vertical guide path 32, there is formed a door-closing-wire through hole 33 though which a door-closing wire 11 wound on a rotary drum 73 of the electric drive unit 7 and later described passes. In FIGS. 6 and 8, at the rear end, there is formed a door-opening-wire through hole 34 through which a door-opening wire 12 wound on the rotary drum 73 in the electric drive unit 7 and later described passes.

Over the door-closing-wire through hole 33 of the side wall 321 of the lower guide rail 3, a front wire guide 16 having a pulley 161 on which the door-closing wire 11 is wound is fixed to close the door-closing-wire through hole 33. The door-closing wire 11 goes in the lower guide rail 3 through the door-closing-wire through hole 33 via the front wire guide 16.

Over the door-opening-wire through hole 34 of the side wall 321 of the lower guide rail 3, a rear wire guide 17 having a pulley 171 on which the door-opening wire 12 is wound is fixed to close the door-opening-wire through hole 34. The door-opening wire 12 goes in the lower guide rail 3 through the door-opening-wire through hole 34 via the rear wire guide 17.

In FIG. 6, at the rear end of the lower guide rail 3, an L-like stopper plate 19 is fixed. On the front surface of the stopper plate 19, a cushion member 20, such as rubber, which gets in touch with the rear end of the lower roller bracket 4 is fixed to stop the sliding door 2 at the full-open position.

Figure 2:
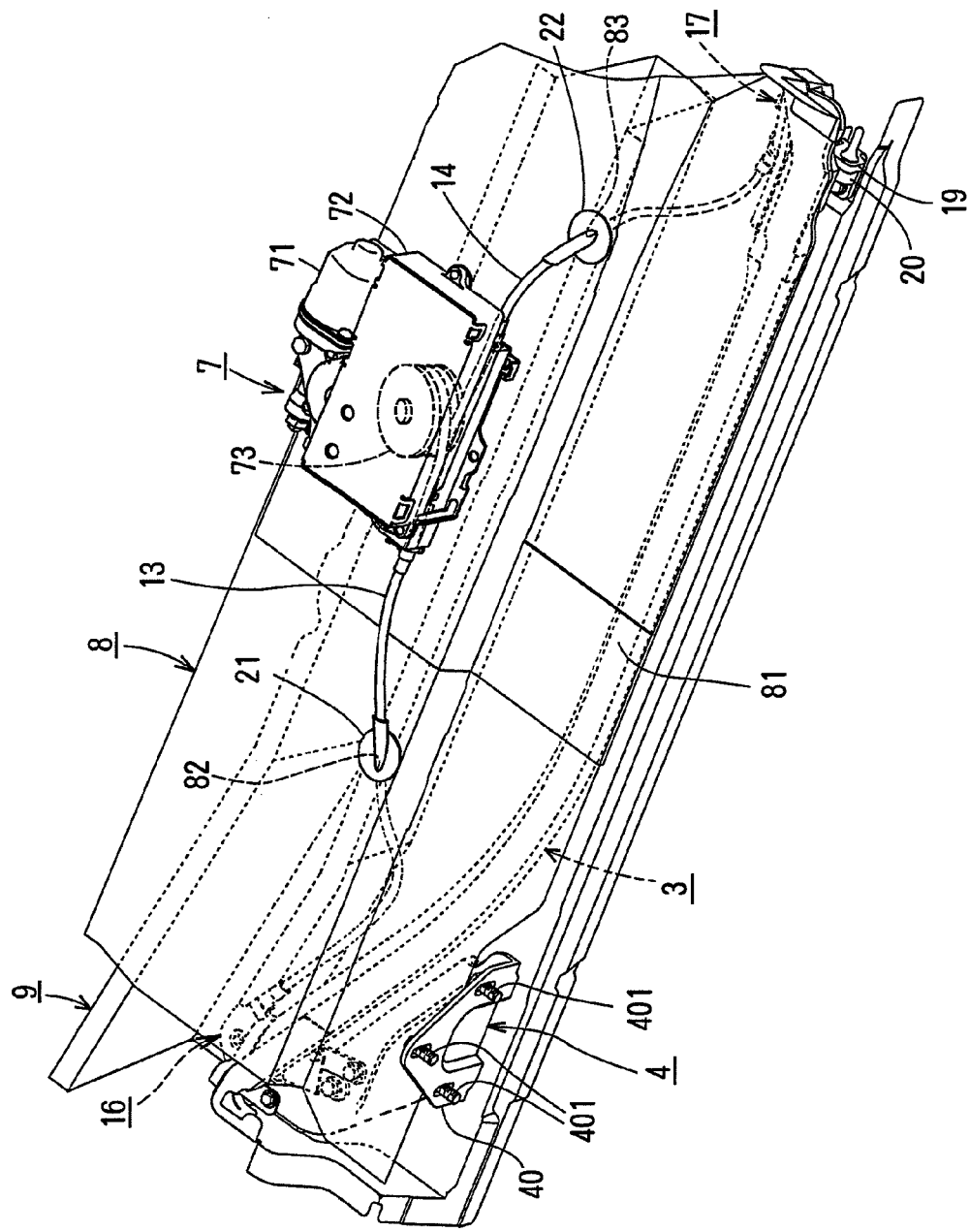
FIG. 2 is a perspective view of a main part of the vehicle.

In FIGS. 3 and 7-9, the lower roller bracket 4 comprises a base plate 40 fixed to the sliding door 2 with bolts 401; a horizontal roller 41 rotating on a vertical shaft 411 and rolling in the horizontal guide path 31 of the lower guide rail 3; a vertical roller 42 rotating on a horizontal shaft 421 and rolling in the vertical guide path 32; a wire-coupling bracket 43 connected to cylindrical wire ends 111,121 fixed to the ends of the door-opening/closing wires 11,12; and a guide plate 44 with which the door-closing wire 11 is partially in contact. With opening and closing of the sliding door 2, the lower roller bracket 4 reciprocates between the full-closed position in FIGS. 2 and 7 and the full-open position in FIGS. 4 and 8.

The horizontal roller 41 is pivotally mounted above the vertical roller 42 behind the vertical roller 42 of the base plate 40. The wire-coupling bracket 43 is fixed with a bolt 15 and a holding plate 45 behind the horizontal roller 41 above the base plate 40. The wire-coupling bracket 43 has on the lower surface a circular-groove circular-groove door-opening engagement portion 432 in which the wire ends 111, 121 of the door-closing and door-opening wires 11, 12 rotatably engage respectively.

The engagement portions 431, 432 are spaced apart from the vertical roller 42, close to the horizontal roller 41 and at substantially equal height to the horizontal shaft 421 of the vertical roller 42. The door-closing engagement portion 431 is spaced apart from the door-opening engagement portion 432 with respect to the vehicle body. The wire ends 111, 121 of the wires 11, 12 are spaced apart from each other transversely of the vehicle and coupled to the lower roller bracket 4 such that a straight line A connecting the center of the wire end 111 to the center of the wire end 121 is substantially perpendicular to an opening direction of the sliding door 2 in FIG. 8. The wire ends 111, 121 of the wires 11, 12 are held by a lower holding plate 46 fixed to the lower surface of the wire-coupling bracket 43.

In FIG. 8, the cushion member 20 keeps in contact with the rear edge just behind the engagement portions 431,432 of the wire-coupling bracket 43 to allow the sliding door 2 to stop at the full-closed position via the lower roller bracket 4.

The wire ends 111, 121 of the wires 11, 12 are coupled to the lower roller bracket 4 behind the horizontal roller 41 and vertical roller 42 so that a front part uncoupled to the wire ends 111, 121 of the roller bracket 4 to project forward greatly. The size of the roller bracket 4 along the opening direction can be kept to a minimum. The lower roller bracket 4 can move to a position where the vertical roller 42 is in front of the pulley 161 or the front end of the curved portion 3A of the lower guide rail 3. The front wire guide 16 is mounted at a position where it does not project forward from the front end of the guide rail 3, thereby allowing the sliding door 2 to move to the full-closed position.

According to the structure in which the wire ends 111, 121 are coupled to the roller bracket 4 at a position where the wire ends 111, 121 are nearer to the outside of the vehicle than the vertical roller 42, coupling portions of the wire ends 111, 121 to the lower roller bracket 4 do not project inward of the vertical roller 42 in the lower guide rail 3, thereby preventing the coupling portions of the wire ends 111, 121 from touching the side wall 321 of the guide rail 3.

The guide plate 44 is fixed to the upper surface of the base plate 40, and the side of the vertical roller 42 is covered with the end of the guide plate 44. A guide portion 441 extends toward the door-closing engagement portion 431 obliquely from the end of the guide plate 44.

The guide portion 441 guides the door-closing wire 11 for the vertical roller 42 not to come in contact with the door-closing wire 11 passing between the vertical roller 42 and the side wall 321 of the lower guide rail 3. Thus, even when the wire end 111 of the door-closing wire 11 is mounted behind the vertical roller 42 and is nearer to the outside of the vehicle than the vertical roller 42, the door-closing wire 11 prevented from coming in contact with the vertical roller 42 to allow the vertical roller 42 to rotate smoothly and to prevent the door-closing wire 11 from cutting off.

The electric drive unit 7 comprises a reversible motor 71; a reduction gear (not shown) coupled to the side of the motor 71 to reduce rotation speed of the motor 71; and a gear case 72 including a rotary drum 73. The gear case 72 is disposed horizontally on the floor 8 to allow the rotary drum 73 to have a a vertical axis, thereby minimizing a projection of the electric drive unit 7 within the compartment.

On the rotary drum 73, the door-closing wire 11 for pulling the sliding door 2 to close and the door-opening wire 12 for pulling it to open are wound so that they are wound onto and taken out of the drum 73.

A flexible door-closing outer tube 13 connects the front wire guide 16 to the gear case 72. The outer tube 13 passes through a front through hole 82 in the floor 8 and is guided from the upper surface to the lower surface of the floor 8. In the front through hole 82, there is provided an annular seal 21 such as rubber to seal a gap between the hole 82 and the outer tube 13.

The front through hole 82 is formed between the front wire guide 16 and the gear case 72 and between the lower guide rail 3 and the side frame 9.

The door-closing wire 11 passes through the door-closing outer tube 13 from the front end of the gear case 72 and comes in the lower guide rail 3 through the door-closing wire through hole 33 via the front wire guide 16. The wire end 111 fixed to the rear end of the door-closing wire 11 in the lower guide rail 3 is coupled to the door-closing engagement portion 431 on the lower roller bracket 4.

A flexible door-opening outer tube 14 connects the gear case 72 to the rear wire guide 17. The door-opening outer tube 14 passes through a rear through hole 83 and is guided from the upper surface to the lower surface of the floor 8. In the rear through hole 83, there is provided an annular seal 22 such as rubber to seal a gap between the rear through hole 83 and the outer tube 14.

The rear through hole 83 is formed between the gear case 72 and the rear wire guide 17 on the floor 8 and between the lower guide rail 3 and the side frame 9.

The door-opening wire 12 passes through the door-opening outer tube 14 from the rear end of the gear casing 72 and is guided in the lower guide rail 3 through the door-opening through hole 34 via the rear wire guide 17. The wire end 121 fixed to the rear end of the door-opening wire 12 in the lower guide rail 3 is coupled to the door-opening engagement portion 432 on the lower roller bracket 4 as described above.

The door-opening and door-closing outer tubes 13,14 for connecting the gear case 72 to the front wire guide 16 and the rear wire guide 17 respectively passes from the upper surface to the lower surface of the floor 8, and the door-opening and door-closing wires 11,12 pass through the door-opening and door-closing outer tubes 13,14 respectively. Thus, the gear case 72 of the electric drive unit 7 can be connected to the lower roller bracket 4 as short as possible. The front and rear through holes 82,83 are formed between the lower guide rail 3 and the side frame 9 on the floor 8 to allow the door-opening and door closing outer tubes 13,14 to be disposed between the lower guide rail 3 under the floor 8 and the side frame 9 thereby utilizing an unused space under the floor 8.

The embodiment of the present invention will operate as below. When the sliding door 2 is in the full-open position, the lower roller bracket 4 is positioned at the rear end of the straight portion 3B of the lower guide rail 3 in FIGS. 3 and 8. The rear end of the wire coupling bracket 43 keeps in contact with the cushion member 20 on the stopper plate 19. In order not to get in touch with the vertical roller 42, the door-closing wire 11 keeps in contact with the guide portion 441 of the guide plate 44.

With operation of the switch (not shown) on the driver's seat in the vehicle, the rotary drum 73 rotates for closing with power of the motor 71 in the electric drive unit 7. The door-closing wire 11 is wound onto the rotary drum 73 and the door-opening wire 12 is taken out of the rotary drum 73. The lower roller bracket 4 is pulled forward with the door-closing wire 11 and moves along the straight portion 3B of the lower guide rail 3 to come in the curved portion 3A.

The lower roller bracket 4 comes in the curved portion 3A of the lower guide rail 3, so that the sliding door 3 moves forward and inward of the vehicle. The wire end 111 of the door-closing wire 11 is positioned behind the horizontal roller 41 and the vertical roller 42 of the lower roller bracket 4 and coupled to the door-closing engagement portion 431 outer of the vehicle to allow the lower roller bracket 4 to move along the curved portion 3A inward of the vehicle to the full-closed position efficiently. Finally, in FIG. 7, the vertical roller 42 of the lower guide bracket 4 moves in front of the front guide wire 16 to allow the sliding door 2 to be in the full-closed position.

When the sliding door 2 is in the full-closed position, a door latch (not shown) at the rear end of the sliding door engages with a striker (not shown) fixed to the vehicle body to allow the sliding door 2 to be held in the full-closed position and to allow the motor 71 in the electric drive unit 7 to stop.

Meanwhile, when the sliding door 2 is in the full-closed position, the rotary drum 73 rotates with the switch by power of the motor 71 in the electric drive unit 7, the door-opening wire 12 is wound onto the rotary drum 73 and the door-closing wire 11 is taken out of the rotary drum 73. The lower roller bracket 4 is pulled rearward by the door-opening wire 12 and moves to the full-open position.

The foregoing merely relates to an embodiment of the invention. Various changes and modifications may be made by a person skilled in the art without departing from the scope of claims wherein:

What is claimed is:

1. A door-opening device in a vehicle sliding door, comprising:
   a lower guide rail mounted longitudinally of the vehicle under a floor of a vehicle;
   a lower roller bracket mounted to the sliding door to move back and forth along the lower guide rail; wherein the lower roller bracket comprises a horizontal roller that rolls in a horizontal guide path of the lower guide rail; and a vertical roller that rolls in a vertical guide path of the lower guide rail;
   an electric drive unit disposed on the floor of the vehicle;
   a front wire guide at a front end of the lower guide rail;
   a rear wire guide at a rear end of the lower guide rail;
   a door-closing outer tube extending from the electric drive unit to the front wire guide through a front through hole in the floor;
   a door-opening outer tube extending from the electric drive unit to the rear wire guide through a rear through hole in the floor;
   a door-closing wire that is wound in the electric drive unit and extends through the door-closing outer tube from the electric drive unit to the lower roller bracket via the front wire guide, the door-closing wire comprising a first front wire end;
   a door-opening wire that is wound in the electric drive unit and extends through the door-opening outer tube from the electric drive unit to the lower roller bracket via the rear wire guide; the door-opening wire comprising a second front wire end, the first and second front wire ends being coupled to a wire coupling bracket mounted on a base plate of the lower roller bracket, the horizontal roller and the vertical roller being disposed at positions which are nearer to a front of the vehicle than the first and second front wire ends, thereby allowing the sliding door to move to a full-closed position; and
   a side frame fixed beneath the floor to reinforce the floor, wherein the front through hole and the rear through hole are formed between the lower guide rail and the side frame.

2. The door-opening device of claim 1, wherein the electric drive unit comprises a motor; a rotary drum on which the door-closing wire and the door-opening wire are wound; and a gear case including the rotary drum, the gear case being disposed to allow the rotary drum to have a vertical axis.

3. The door-opening device of claim 1, wherein the electric drive unit is disposed under a seat on the floor.

* * * * *